E. W. RIETZ.
TUBULAR, COLLAPSIBLE DIAPHRAGM FOR HOSE COUPLINGS.
APPLICATION FILED OCT. 1, 1914.
1,165,449.
Patented Dec. 28, 1915.
2 SHEETS—SHEET 2.
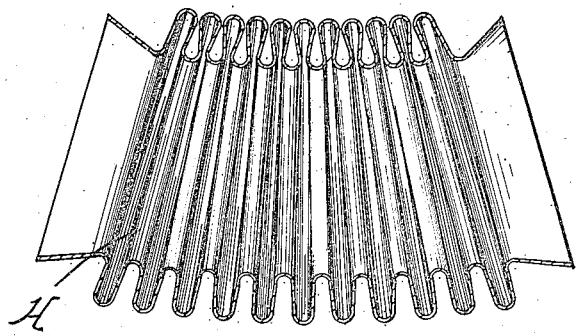
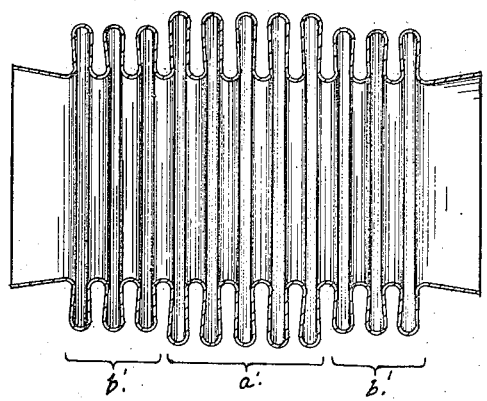
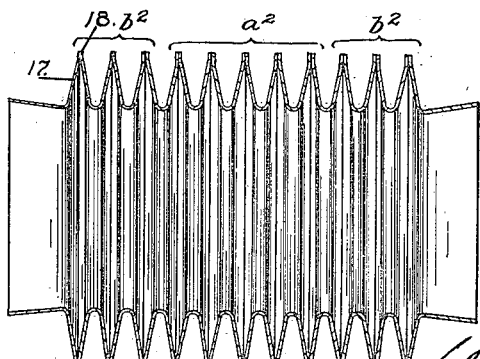

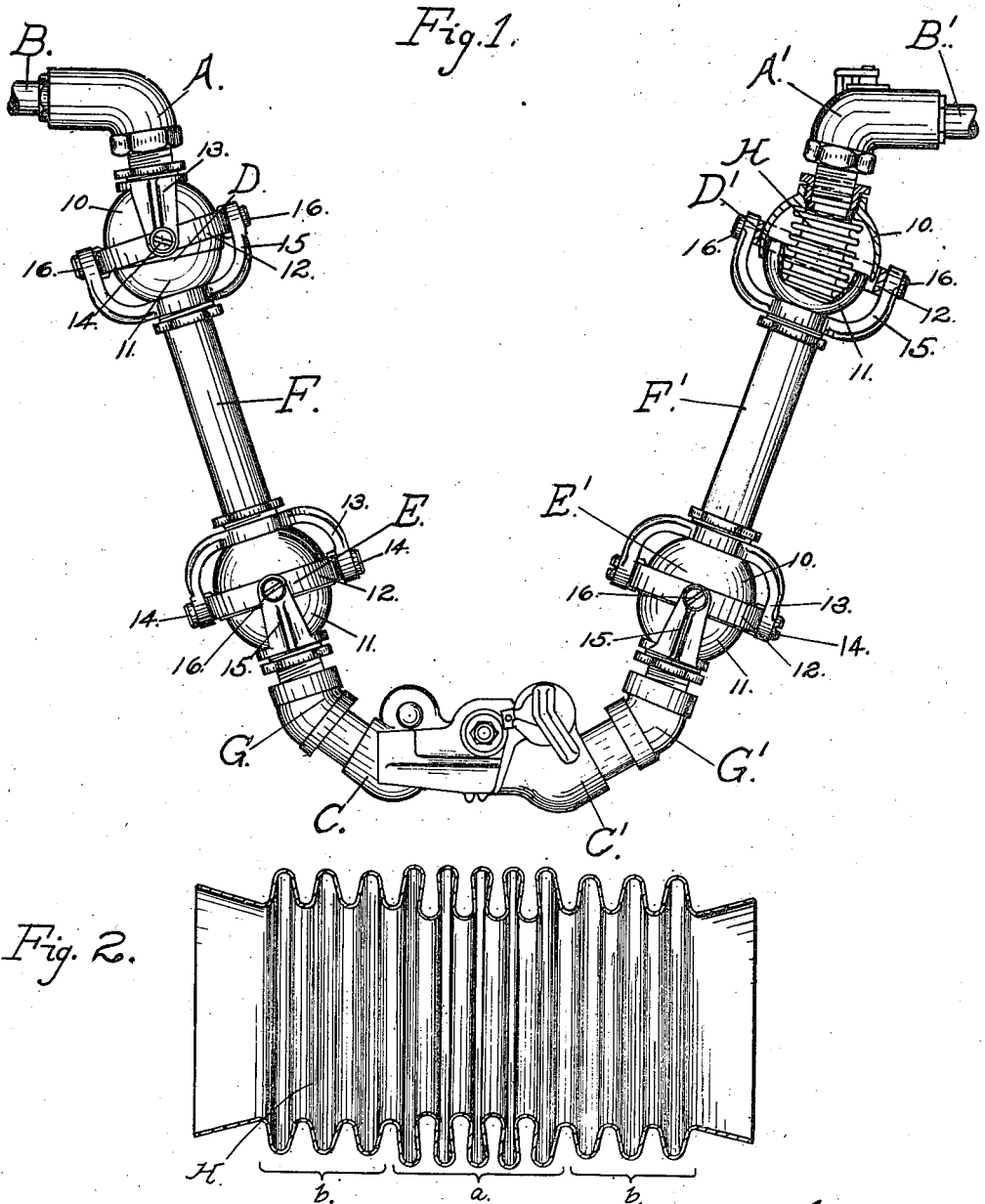

UNITED STATES PATENT OFFICE.

ELMER W. RIETZ, OF CHICAGO, ILLINOIS, ASSIGNOR TO CHICAGO CAR HEATING COMPANY, OF CHICAGO, ILLINOIS, A CORPORATION OF ILLINOIS.

TUBULAR, COLLAPSIBLE DIAPHRAGM FOR HOSE-COUPLINGS.

1,165,449.  Specification of Letters Patent.  Patented Dec. 28, 1915.

Application filed October 1, 1914. Serial No. 864,475.

*To all whom it may concern:*

Be it known that I, ELMER W. RIETZ, a citizen of the United States, residing at Chicago, in the county of Cook and State of Illinois, have invented certain new and useful Improvements in Tubular, Collapsible Diaphragms for Hose-Couplings, of which the following is a specification.

My invention relates to a tubular, metallic structure circumferentially corrugated, convoluted or plaited so as to be collapsible, these structures being commonly called "bellows diaphragms"; and the invention contemplates particularly a diaphragm of this sort which may be used as a part of a flexible or universal joint in a metallic hose coupling for railway train pipes, either steam or air. The requirements of a tubular element or structure, when employed in this connection, are somewhat peculiar as will be hereinafter explained.

The primary object of the invention is to provide a tubular, metallic, flexible bellows diaphragm of such configuration that it will be capable of withstanding for a long time the incessant flexures due to the vibratory movements of the parts of a coupling when in service and, at the same time, will have the capacity for bending or collapsing on one side and expanding at diametrically opposite points sufficiently to permit the coupler heads to be coupled and uncoupled without danger of crushing or overstraining the plaits or corrugation.

As it is quite possible that the tubular structure of my invention may have utility in other situations where somewhat similar conditions prevail, I do not wish to be limited to its use in connection with a metallic hose coupling of the type to be hereinafter described; although, in view of the particular adaptability of the diaphragms for use in forming the steam ports through the universal joints of a metallic train pipe coupling it is my belief that the invention will find its greatest utility in this connection.

The invention is illustrated in certain embodiments in the acompanying drawings wherein—

Figure 1 is a side view of a metallic hose coupling in connection with which the structure of my invention is designed particularly to be used; the bells or casing members of one of the joints being shown as broken away so as to illustrate the position of the diaphragm employed to form the steam port through said joint. Fig. 2 is a longitudinal sectional view taken through a tubular, corrugated diaphragm constructed in accordance with the principles of my invention; Fig. 3, a similar view, on an enlarged scale, of the diaphragm when flexed as in coupling or uncoupling; Fig. 4, a view, similar to Fig. 2, showing a modified structure, and Fig. 5, a similar view showing another modification.

Like characters of reference designate like parts in the several figures of the drawings.

Referring first to Fig. 1, A, A' designate the angle cocks or end valves on the adjacent ends of two cars of a train, the cars not being shown, the extremities of the steam train lines being indicated at B, B'. The coupling comprises the usual Sewall or gravity type coupler heads C, C' which are coupled and uncoupled by angular movements in vertical directions. It comprises further, a pair of universal joints D, D' connected to the end valves A, A' respectively, and a pair of similar universal joints E, E' which are connected to joints D, D' by the straight pipe sections F, F' and to the coupler heads C, C' by the elbow pipes G, G'. The universal joints D, D', E, E', are composed, in each case, of a pair of bells 10, 11, one extending within the other, an annulus 12, a yoke 13 rigidly connected with the bell 10 and pivoted to the annulus by pivot pins 14, and a yoke 15 rigidly connected with the bell 11 and pivoted to the annulus 12 by pins 16. These joints give the coupling the flexibility required by the vibratory movements of the cars and the relative movements between the cars in rounding curves, and also the capacity for flexing which the coupling must have in order that the coupler heads C, C' may be engaged and disengaged by the usual swinging movements downwardly and upwardly, respectively. Within each joint is arranged a tubular, corrugated, collapsible diaphragm H which is secured at opposite ends with steam-tight joints to the bells 10, 11, the diaphragm providing a steam port through the joint which does away entirely with the necessity of packing the joint, an operation which has been found quite difficult, expensive and not productive of lasting results.

It is essential that diaphragms, such as the diaphragm H, be capable of withstanding almost incessant vibratory movements of small amplitude during the periods that the coupling is in service. They must also be capable of occasionally being bent or flexed to quite a considerable extent, that is to say, when the coupler heads C, C' are coupled together or uncoupled. It has been found, by practical experience under service conditions and extensive tests, that if instead of having the corrugations or convolutions of the diaphragm uniform in their arrangement and configuration from end to end of the device, the corrugations or convolutions in the middle portion stand closer together than those at the end portions so that there will be a greater number of said corrugations or convolutions per lineal unit axially of the diaphragm at the middle thereof than at the ends, the diaphragm will withstand, without breaking or cracking, a very much larger number of vibrations; the wider spaces between the end corrugations giving the structure the capacity for flexing sufficiently far to permit the coupling and uncoupling of the coupler heads. With the diaphragm secured at opposite ends the middle portion is subjected to greater strain, when there is an angular movement between the rigid parts of the coupling to which the diaphragm is secured, than the end portions. In fact, in the ordinary vibrations which occur when the train is in motion, the corrugations near the ends of the diaphragm are collapsed or expanded but very little. On the other hand, there is a constant bending of the diaphragm back and forth at the middle. Obviously the greater number of corrugations there are per lineal unit at the place where the maximum strain occurs, over which such strain can be distributed, the more durable the structure will be. By bringing the corrugations or convolutions at the center of the diaphragm close together, that is, by multiplying their number per lineal unit, the capacity of this portion of the structure to flex or collapse is proportionately limited. In the arrangement provided by my invention the corrugations at the extremities of the diaphragm are fewer in number per lineal unit than those at the middle in order that they may give to the diaphragm the capacity to flex, particularly in coupling and uncoupling, which it loses because of the closeness together of the middle corrugations. While this makes the ends of the diaphragm less capable of withstanding bending or collapsing strains, this circumstance is of no practical importance since these portions of the diaphragm are but little subjected to such strains.

I apprehend that a diaphragm having, to a certain extent, at least, the qualities and capacities above specified might be constructed in different ways from that described; and certain of these modifications will be suggested hereafter.

Figs. 2 and 3 illustrate a preferred form of diaphragm constructed according to the principles of my invention. The center group of corrugations $a$ are relatively close together. The end groups $b$ stand farther one from the other. This difference in configuration between the end and middle corrugations may be brought about by taking a diaphragm in which the corrugations are uniform and either compressing the middle corrugations or expanding the end corrugations, or both. In such case, if the expansion or compression of the corrugations, as the case may be, is carried far enough, a difference in depth will be produced between the middle corrugations and end corrugations, as is shown on a somewhat exaggerated scale in Fig. 2. When the diaphragm is flexed in the coupling or uncoupling operation, as shown in Fig. 3, the middle corrugations on the collapsed side are first brought together, after which the end corrugations are collapsed, the metal forming the latter bending more than the metal at the middle of the diaphragm. This would, of course, be fatal if it were not for the fact that the ends are subjected to a flexure of this magnitude very seldom in comparison with the incessant bending of the middle part of the diaphragm under the strains produced by the vibration of the cars.

I apprehend that a similar result could be obtained, although probably at considerably greater manufacturing cost, by means of a diaphragm constructed as shown in Fig. 4 in which the corrugations are of the same width from end to end of the structure, but in which those of the middle group $a'$ are deeper than those of the end groups $b'$ If desired, instead of making the diaphragm of a single integral sheet of metal, it might be constructed, as shown in Fig. 5, of separate annuli 17 V-shaped in cross section and soldered together at 18, the end groups $b^2$ of the corrugations being stretched or expanded so that there are fewer of them per lineal unit axially of the diaphragm than those of the middle group $a^2$, in analogy to the arrangement shown in Figs. 2 and 3.

Other structural modifications might be devised without departure from the invention, for example, while the corrugations are shown as circular, that is, as made up of endless annuli, they might be in the form of a continuous spiral.

I do not claim as my invention the structure of the coupling except in connection with the improvement in the diaphragm herein disclosed as the rest of the coupling is the invention of Edward A. Schreiber and is disclosed in application Serial No. 865161, filed by said Schreiber October 5, 1914.

I claim:

1. In a hose coupling, the combination with coengaging coupler heads of the gravity type, of pipe sections and flexible joints interposed between said pipe sections and said coupler heads respectively; said joints comprising in each case a tubular, circumferentially corrugated, flexible, metallic diaphragm forming a fluid port between the pipe section and corresponding coupler head, the middle portion of which diaphragm is more flexible than the end portions thereof.

2. In a hose coupling, the combination with coengaging coupler heads of the gravity type, of pipe sections and flexible joints interposed between said pipe sections and said coupler heads respectively; said joints comprising in each case a tubular, circumferentially corrugated, flexible, metallic diaphragm forming a fluid port between the pipe section and corresponding coupler head, the middle corrugations of which diaphragm stand closer one to another than the end corrugations thereof.

3. In a hose coupling, the combination with coengaging coupler heads of the gravity type, of pipe sections and flexible joints interposed between said pipe sections and said coupler heads respectively; said joints comprising in each case a tubular, circumferentially corrugated, flexible metallic diaphragm forming a fluid port between the pipe section and corresponding coupler head, the middle corrugations of which diaphragm stand close one to another and are deeper than the end corrugations thereof.

4. In a hose coupling, the combination with coengaging coupler heads of the gravity type, of pipe sections and flexible joints interposed between said pipe sections and said coupler heads respectively; said joints comprising in each case a tubular, circumferentially corrugated, flexible, metallic diaphragm forming a fluid port between the pipe section and corresponding coupler head, the middle corrugations of which diaphragm are deeper than the end corrugations thereof.

5. In a hose copuling, the combination with coengaging coupler heads of the gravity type, of pipe sections and flexible joints interposed between said pipe sections and said coupler heads respectively; said joints comprising in each case a tubular, circumferentially corrugated flexible, metallic diaphragm forming a fluid port between the pipe section and corresponding coupler head, the middle portion of which diaphragm has a greater area of metal per lineal unit axially of the diaphragm than the end portions thereof.

6. A tubular, circumferentially corrugated flexible, metallic diaphragm, the middle portion of which is more flexible than the end portions thereof.

7. A tubular, circumferentially corrugated, flexible, metallic diaphragm, the middle corrugations of which stand closer one to another than the end corrugations thereof.

8. A tubular, circumferentially corrugated, flexible. metallic diaphragm, the middle corrugations of which are deeper than the end corrugations thereof.

9. A tubular, circumferentially corrugated, flexible, metallic diaphragm, the middle corrugations of which stand closer one to another and are deeper than the end corrugations thereof.

10. A tubular, circumferentially corrugated, flexible, metallic diaphragm, the middle portion of which has a greater area of metal per lineal unit axially of the diaphragm than the end portions thereof.

11. A tubular, flexible, metallic diaphragm formed with a plurality of annular circumferential corrugations, the middle corrugations standing closer one to another than the end corrugations.

12. A tubular, flexible, metallic diaphragm formed with annular circumferential corrugations, the middle portion of which diaphragm is more flexible than the end portions thereof.

ELMER W. RIETZ.

Witnesses:
L. A. FALKENBERG,
G. Y. SKINNER.